March 22, 1966      P. M. FIELD      3,241,258
SLIDE MOUNT FOR PHOTOGRAPHIC FILM Original Filed March 22, 1962      2 Sheets-Sheet 1

PHILIP M. FIELD
INVENTOR.

BY
ATTORNEY

March 22, 1966     P. M. FIELD     3,241,258
SLIDE MOUNT FOR PHOTOGRAPHIC FILM
Original Filed March 22, 1962     2 Sheets-Sheet 2
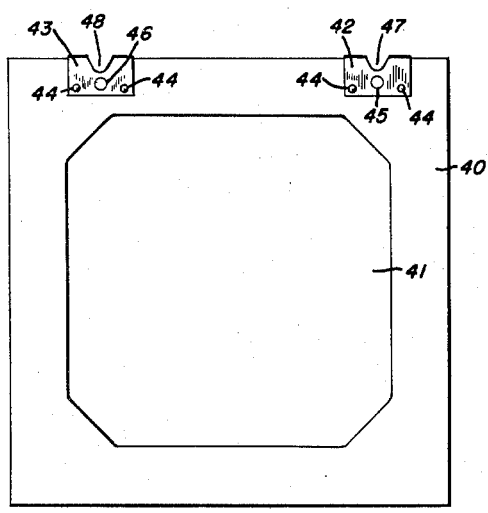
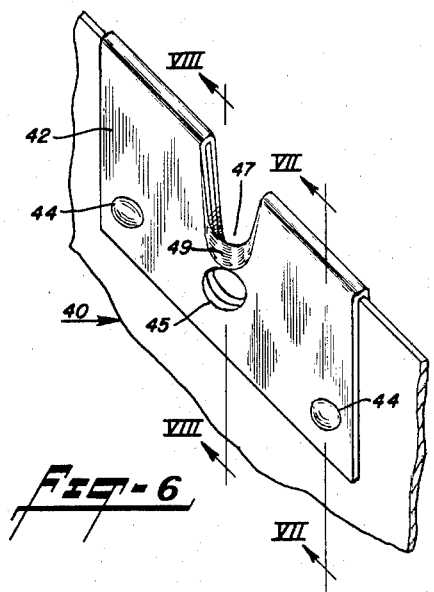
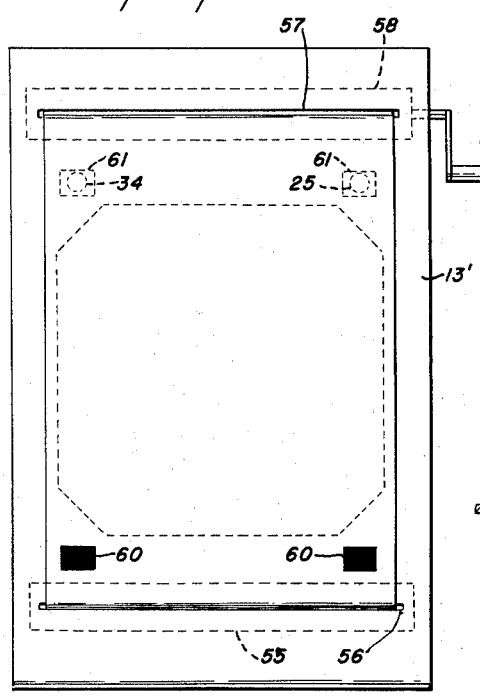
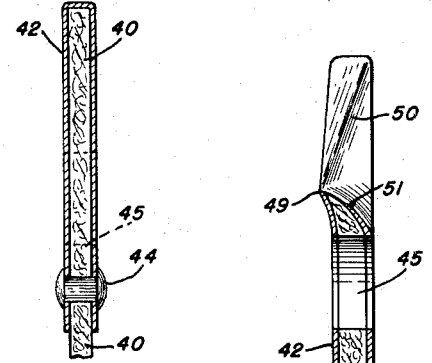
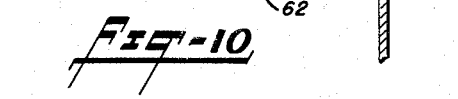
PHILIP M. FIELD
INVENTOR.
BY Rudolph J. Lurick
ATTORNEY

United States Patent Office 3,241,258
Patented Mar. 22, 1966

3,241,258
SLIDE MOUNT FOR PHOTOGRAPHIC FILM
Philip M. Field, Maplewood, N.J., assignor to Charles Beseler Company, East Orange, N.J., a partnership
Original application Mar. 22, 1962, Ser. No. 181,612, now Patent No. 3,190,174, dated June 22, 1965. Divided and this application Oct. 16, 1964, Ser. No. 404,390
5 Claims. (Cl. 40—152)

This invention relates to a mount for photographic film and more particularly to a slide mount for use on an overhead photographic projector.

This application is a division of my co-pending application Serial No. 181,612, filed March 22, 1962, and entitled, "Slide-actuated Switch for Photographic Projector," now Patent No. 3,190,174.

A slide mount made in accordance with this invention is particularly adapted for use with an overhead projector having a transparent, horizontal projection stage for supporting a slide to be projected onto a screen. Light from a condensing lens system is directed upwardly through the projecting stage and the slide to a projection head. Such head comprises a lens-mirror combination for projecting a picture of the slide upon a vertically disposed screen positioned behind the operator. Projectors of this class are provided with a relatively large projection stage, which permits the operator to write upon the slide, with a wax pencil or transparent ink, whereby such writing appears simultaneously on the screen. This, however, requires that some means be provided to retain the slide stationary during the act of writing thereon. Otherwise, the operator is obliged to hold the slide with one hand while writing with the other, which often interferes with the projection and, at best, is a nuisance.

It is desirable that the projector lamp be turned off between the successive showing of slides so that the screen is not illuminated with a brilliant flash of light when the slide is removed from the projecting stage, since this is distracting to the audience. Toward this end, the projector is provided with a switch in the lamp circuit, which switch is actuated by the slide. The above-referenced co-pending application is directed to a projector provided with a magnetically-actuated switch arrangement, which arrangement does not require physical contact between the slide and the switch actuating mechanism and is independent of the thickness of the particular slide. The present invention is directed to a novel slide mount provided with means for properly locating the slide on the projection stage, for holding the slide in position without the need of other clamping means, and for actuating a switch in the lamp circuit of the projector.

An object of this invention is the provision of a novel mount for photographic slides.

An object of this invention is the provision of a photographic slide mount provided with magnetic material means for effecting operation of a magnetically actuated switch carried by the projector.

An object of this invention is the provision of a slide mount for use on an overhead photographic projector, said mount being provided with means for properly positioning and holding a slide on the projection stage and for operating a magnetically actuated switch carried by the projector.

These and other objects and advantages will become apparent from the following description when taken with the accompanying drawings illustrating several embodiments of the invention. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

FIGURE 5 is a plan view of a slide mount drawn to the same scale as FIGURE 2;

FIGURE 6 is an enlarged, fragmentary, isometric view showing one of the magnetic material tabs which are attached to the slide mount;

FIGURES 7 and 8 are cross sectional views taken along the lines VII—VII and VIII—VIII of FIGURES 5, respectively;

FIGURE 9 is a plan view of the projection stage and showing another embodiment of the invention; and FIGURE 10 is a fragmentary, cross-sectional view showing a spring-biased locating pin particularly adapted for use with the FIGURE 9 embodiment of the invention.

Figure 1:
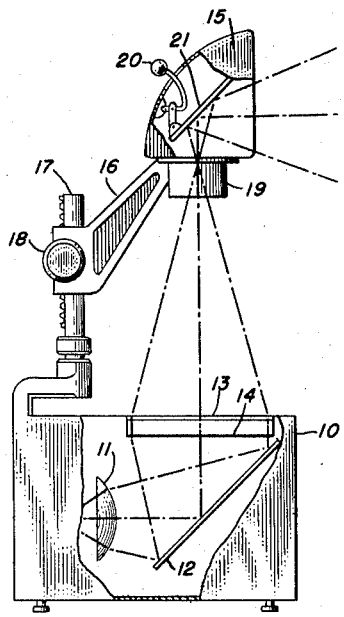
FIGURE 1 illustrates an overhead projector of the class adapted for use with a slide mount made in accordance with this invention.

Reference, now, is made to FIGURE 1 wherein there is shown an overhead projector of conventional construction comprising a housing 10 which carries a lamp (not shown), a condensing lens 11, a tilted light-reflecting mirror 12, a projection stage 13, and a Fresnel lens 14. The optical system is such that a vertical light beam is directed through the transparent portion of the projection stage to a projection head 15 that is carried by an arm 16 that is slidably mounted on a post 17 extending upwardly from the housing. The spacing between the projection head 15 and the projection stage 13, for the purpose of focusing the image upon a vertical screen, is effected by rotation of the knob 18. The lens of the projection head is disposed within a barrel 19 and a handle 20 affords a means for changing the angular tilt of the mirror 21 for altering the elevation of the projected image.

The material to be projected is comprised of photographic film affixed to a cardboard mount and is referred to as a mounted slide. When the projector lamp is energized, the placement of the mounted slide upon the projection stage results in a projection of the material onto the screen, the projection stage having a transparent plate of a size and shape conforming to that of the exposed film area in the slide mount.

Figure 2:
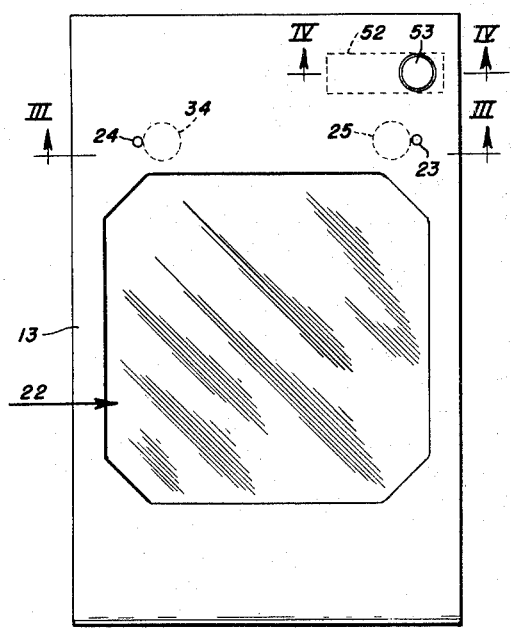
FIGURE 2 is a plan view of the projection stage, drawn to a larger scale.
Figure 3:
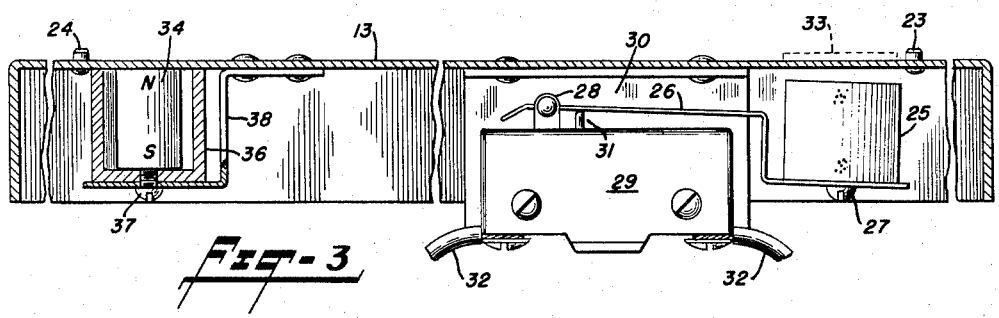
FIGURE 3 is a cross-sectional view taken along the line III—III of FIGURE 2.

FIGURE 2 is a plan view of the projection stage 13 which is a flat plate having an opening closed by a transparent plate 22 which is flush with the top surface of the plate, thereby forming a flat surface for support of a slide placed thereon. In the present instance, the plate is made of non-magnetic material, such as aluminum. A pair of locating pins 23, 24 are carried by the plate and extend upwardly from the surface thereof. These pins serve to properly locate the slide for projection purposes, as will be described hereinbelow. The mechanism for actuating an electric switch for controlling energization and deenergization of the projector lamp is a bar magnet 25 disposed below the plate 13, as shown in FIGURE 3, to which reference now is made.

The magnet 25 is secured to an arm 26, as by the screw 27, which arm is mounted for pivotal movement about a shaft carried by the bracket 28 which is secured to a micro switch 29. This switch is secured in fixed position relative to the plate 13 by means of the L-shaped mounting bracket 30. A biasing spring, not visible in the drawing, is assembled on the pivot shaft of the arm 26 in such manner that the arm normally is biased in a counterclockwise direction. The arrangement of the parts is such that the weight of the magnet 25 is sufficient to overcome the force of the spring urging the arm upwardly whereby the magnet is spaced from the plate 13 and the actuating pin 31 of the micro switch is in the depressed position. In such position of the actuating pin, the switch is in the open position. Thus, with the switch connected in series between the projector lamp and the voltage source, by the leads 32, the lamp will be deenergized. If, now, a soft-iron plate 33 is placed upon the plate 13 over the magnet 25, the magnet will be attracted thereto and will move into engagement with the lower surface of the plate. The corresponding counterclockwise rotation of the arm 26 permits the switch-actuating pin 31 to move upwardly (under the action of a self-contained spring contained within the switch housing) thereby closing the switch contacts and completing the electrical circuit to the projector lamp. Removal of the metal plate 33 results in a return of the magnet and the switch-actuating pin to the illustrated OFF position.

A similar permanent magnet 34 is mounted in fixed position proximate to the other locating pin 24, for purposes to be described below. As shown in the drawing, the magnet 34 is cylindrical and is contained within a metal casing, of non-magnetic material, provided with a threaded hole to receive the screw 37 whereby the magnet is secured in position by means of a simple bracket 38. It is here pointed out that the magnet 25 is of similar shape and construction although it will be apparent that permanent magnets of other shapes and other specific mounting arrangements may be utilized.

The upward displacement of the magnet 25, to cause a closure of the switch contacts when a slide is properly positioned on the projection stage, is effected by a soft-iron plate secured to the slide mount as will now be described with reference to FIGURES 5–8. Here, the slide mount 40, generally made of cardboard, carries the film 41 having an exposed portion corresponding to the opening in the projection stage. A pair of relatively thin, soft-iron plates 42, 43 are bent over the forward edge of the mount and secured thereto as by rivets 44. The holes 45, 46 extend through the respective plates and the mount material, said holes each having a diameter slightly larger than the locating pins (see pins 23, 24, in FIGURE 2) and the spacing between the holes corresponds to that of said pins. In order to facilitate the placement of the slide on the surface of the projection stage, the metal plates 42, 43 are provided with V-shaped notches, or slots 47, 48, respectively. In forming these slots, the lower, front portion thereof is bulged outwardly slightly, as indicated by the reference numeral 49 in FIGURES 6 and 8. This results in two sloping surfaces extending in opposite directions from the bulge 49 toward the rear surface of the mount. These sloping surfaces 50, 51 are best shown in FIGURE 8, which is a cross-sectional view taken along the line VIII—VIII of FIGURE 6.

When the mounted slide of FIGURE 5 is slidably moved along the surface of the projection stage, the V-shaped notches 47, 48 serve to align the slide with the locating pins 23 and 24 shown in FIGURE 2 and the underlying sloping surfaces guide the locating pins into the mount holes 45, 46. This results in the proper positioning of the slide. At the same time, the mount plates are disposed in the magnetic fields of the two permanent magnets. In the case of the movable magnet 25, the magnetic force results in an upward displacement of the magnet and a closure of the switch in the lamp circuit. Also, the magnetic attraction between the magnet and the plate holds the slide mount against the surface of the projection stage. Similarly, the fixed magnet 34 holds down the left corner of the slide mount. Once the two locating pins are disposed within the holes of the mount plates, lateral movement of the slide is prevented.

Although the described construction of the holes and V-slots in the soft-iron plates of the slide mount is preferred, it is apparent that the holes may be omitted leaving only the V-slots for the proper positioning of the slide. In such case, the base of each V-slot would be semi-circular and of a radius somewhat greater than the diameter of the locating pins. In such arrangement, the force of the magnetic attraction normally will prevent undesirable sliding movement of the slide along the supporting surface, but a forceful sliding pressure exerted upon the slide by the operator may result in displacement of the slide.

It will now be apparent that the placement of the slide in proper position automatically turns the projector lamp on and the removal of the slide turns the lamp off. This has been found to be a practical operation. However, it is recognized that this type of use of a projection lamp is injurious to the lamp in that the in-rush current and thermal fatigue tend to shorten the operating life. Thus, instead of turning the lamp on and off completely, the switch can control the connection of an appropriate resistor into the lamp circuit. When the switch is in the open position, as shown in FIGURE 3, the resistor is effective to lower the lamp voltage but permits the filament to remain heated. Closure of the switch upon placement of a slide into position, shorts out the resistor permitting the lamp to operate at full brilliance. Further, although projectors of this type are generally used in rooms having fairly high ambient light, in some applications they are used in completely darkened rooms. In this circumstance, the above-described switch can, simultaneously with the turning off of the main projector lamp, turn on the auxiliary reading lamp to provide sufficient illumination for the operator of the projector to place the slides into operating position.

Figure 4:
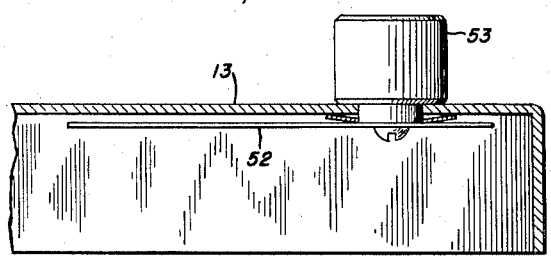
FIGURE 4 is a cross-sectional view taken along the line IV—IV of FIGURE 2.

There may be occasion when the operator of the projector does not wish the projector lamp to be turned off upon removal of the slide. For this purpose, I provide manually-operable means to render ineffective the magnet-actuated switch, as shown in FIGURES 2 and 4. A soft-iron plate 52 is disposed below the projection stage and is secured to a finger-operable knob 53. When the plate 52 is in the position shown in FIGURE 2, it has no effect upon the movable magnet 25. However, a counterclockwise rotation of the knob 53 will bring the plate over the magnet. The plate 52 is sufficiently rigid to prevent flexing thereof and it operates in a plane close to the inner surface of the projection stage 13. Consequently, the magnet 25 is displaced upwardly, thereby retaining the control switch closed irrespective of the presence or absence of a slide on the projection stage.

Overhead projectors are frequently used with a plastic roll, that is, a roll of transparent cellophane, cellulose acetate of similar material which is passed over the projection stage. The operator can write upon this material and whatever he has written is projected on the screen. Also, sometimes the transparent sheet is passed over a slide being projected so that the lecturer can superpose written modifications in the projected material.

FIGURE 9 is a plan view of the projector stage 13' having the conventional light-transmitting opening therein. The sheet of transparent material passes from a supply roll 55, upwardly through a slot 56, over the stage and downwardly through a slot 57 to a take-up roll 58. The latter is rotatable by means of a hand crank 59 to advance the transparent material over the projection stage. Strips 60, 61, of magnetic material, are applied to the transparent material at properly-spaced points, the strips 61 being shown in dotted lines to permit a showing of the underlying permanent magnets 25 and 34. When the operator has completed his writing on the material overlying the projection area, he can rotate the crank 59 to advance the plastic material from the supply roll to the take-up roll. As the upper magnetic strips 61 pass out the magnetic field of the magnets, the magnet 25 drops away from the surface of the plate 13' causing an opening of the switch and extinguishing the projector light. As a clean portion of the plastic material is brought into position, the lower magnetic material strips will overlie the magnets and the magnet 25 will be attracted to its upper position, thereby energizing the lamp. With the magnetic material strips spaced along the entire roll of the plastic material, it will be clear that the lamp is deenergized during a time period beginning shortly after operation of the crank until a clean portion of the plastic material is in position for use.

The locating pins 23 and 24, described with specific reference to the FIGURE 2 embodiment of the invention, are fixed in position on the plate forming the projection stage. Such pins extend only a small distance above the projection stage surface, in fact, such distance need be no greater than the thickness of the slide mount. Fixed locating pins of this type can be incorporated in the FIGURE 9 embodiment of the invention without materially interfering with the normal movement and use of the plastic sheet material. However, in order to retain the plastic sheet in contact with the projection stage surface throughout the entire exposed length of the sheet, the locating pins can be spring biased, as shown in FIGURE 10. Here, the locating pin 23' passes through a clearance hole formed in the plate 13' and is affixed to the free end of a relatively weak leaf spring 62. In this construction, the locating pins are depressed by the plastic sheet. When the plastic sheet is removed for the projection of slides, the pins extend upwardly from the plate 13' and serve the same functions as the described fixed pins.

Having now described the invention, those skilled in this art will have no difficulty making changes and modifications in the illustrated construction and operative assembly of the parts in order to adapt the invention to a specific application. It is intended that such changes and modifications shall fall within the scope and spirit of the invention, as recited in the following claims.

I claim:
1. A slide mount for photographic film comprising means for supporting the film in substantially mono-planar disposition, and magnetic material means secured to the mount along one edge thereof, said magnetic material means being provided with an opening extending therethrough.

2. The invention as recited in claim 1 wherein said magnetic material means comprises a pair of spaced plates each provided with an opening extending therethrough, and wherein each plate also is provided with a generally V-shaped slot formed on one edge, each slot having an apex spaced from the corresponding opening.

3. A slide mount for photographic film comprising a frame member for supporting the film in substantially mono-planar disposition, a pair of spaced, U-shaped magnetic material members disposed over an edge of the frame member; means securing the magnetic material members to the frame member; and means forming openings which extend through each magnetic material member and the frame member.

4. The invention as recited in claim 3, wherein each magnetic material member is provided with a generally V-shaped guide slot aligned with the corresponding opening.

5. The invention as recited in claim 4, wherein the apex portion of each slot is spaced from the corresponding opening and the walls defining the apex portion of each slot are sloped relative to the plane of the frame member.

References Cited by the Examiner
UNITED STATES PATENTS

| | | | |
|---|---|---|---|
| 2,682,722 | 7/1954 | Waller | 40—64 |
| 2,840,659 | 6/1958 | Cooley | 200—87.3 |
| 2,924,682 | 2/1960 | Winterburn | 200—87.3 |

EUGENE R. CAPOZIO, *Primary Examiner.*

JEROME SCHNALL, *Examiner.*